3,131,122
Patented Apr. 28, 1964

3,131,122
METHOD OF PRODUCING ANALGESIA WITH N-SUBSTITUTED-4-PHENYL - 4 - CARBALKOXY-PIPERIDINES
Kurt Freter, Franz Adickes, and Karl Zeile, all of Ingelheim (Rhine), Germany, assignors, by mesne assignments, to Boehringer Ingelheim G.m.b.H., Ingelheim (Rhine), Germany, a corporation of Germany
No Drawing. Filed Apr. 9, 1962, Ser. No. 185,874
Claims priority, application Germany Apr. 14, 1961
2 Claims. (Cl. 167—55)

This invention relates to N-substituted 4-phenyl-4-carbalkoxy-piperidines and their non-toxic, pharmacologically acceptable acid addition salts.

More particularly, the present invention relates to 4-phenyl-4-carbalkoxy-piperidines of the formula

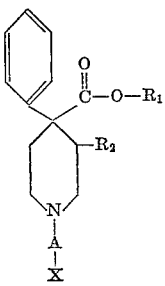

(I)

wherein
$R_1$ is lower alkyl,
$R_2$ is selected from the group consisting of hydrogen and lower alkyl,
A is a saturated or unsaturated, straight or branched hydrocarbon chain of 4 to 8 carbon atoms, which may be interrupted by oxygen or sulfur, and
X is selected from the group consisting of halogen and nitro, and their non-toxic, pharmacologically acceptable acid addition salts.

The compounds of the present invention, that is the N-substituted 4-phenyl-4-carbalkoxy-piperidines embraced by Formula I above and their non-toxic, pharmacologically acceptable acid addition salts, may be prepared by a number of different methods which are well known in principle. However, among these the following methods have proved to be especially advantageous:

*Method A.*—Reaction of a 4-phenyl-4-carbalkoxy-piperidine of the formula

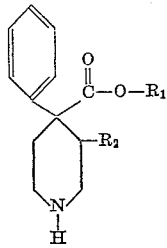

(II)

wherein $R_1$ and $R_2$ have the meanings defined above in connection with Formula I, with a halogen compound of the formula $$Hal\text{—}A\text{—}X \quad (III)$$

wherein A and X have the meanings defined above in connection with Formula I, and Hal is chlorine, bromine or iodine.

The reaction of Compound II with Compound III is preferably performed in the presence of a weak base, such as sodium bicarbonate, and of an inert organic solvent, such as methanol, ethanol and acetonitrile or mixtures thereof, and at a temperature between 0 and 100° C. The reactants are advantageously supplied in equimolar ratio.

Each of the compounds of the Formula I wherein $R_2$ is lower alkyl exists in two diastereoisomeric forms. The separate cis- and trans-forms of Compounds I may be advantageously be obtained by separating the 4-phenyl-4-carbalkoxy-piperidine II into its diastereoisomeric forms at any stage during its preparation by conventional methods, and using either the cis- or the trans-form of Compound II as the starting material in the above-described method, depending on whether the cis- or trans-form of the end product I is desired.

*Method B.*—For the preparation of compounds of the Formula I wherein X is fluorine or nitro the following procedure may be used:

Reaction of a 1,5-dihalo-3-phenyl-3-carbalkoxy-pentane of the formula

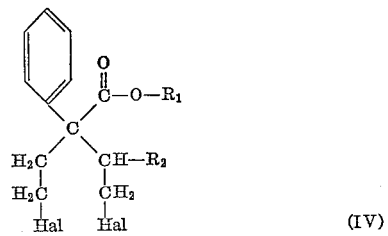

(IV)

wherein $R_1$ and $R_2$ have the meanings previously defined and Hal is halogen, preferably chlorine, bromine or iodine, with a primary amine of the formula $$H_2N\text{—}A\text{—}X \quad (V)$$

wherein A has the meanings defined above and X is fluorine or nitro.

The reaction is preferably performed in the presence of an inert organic solvent and of an alkaline condensation agent, such as sodium bicarbonate or dimethyl aniline, at temperatures between 50 and 150° C.

*Method C.*—For the preparation of compounds of the Formula I wherein X is iodine or nitro, the following procedure may be used:

Synthesis of compounds of the Formula I wherein X is chlorine or bromine by method A, and subsequent exchange of the chlorine or bromine atom for an iodine atom or the nitro group. This exchange is advantageously effected by reacting the compound of the Formula I wherein X is chlorine or bromine with potassium iodide or with silver nitrite or sodium nitrite in the presence of an inert organic solvent, such as dimethylformamide or dimethylsulfoxide.

*Method D.*—For the preparation of compounds of the Formula I wherein X is chlorine or bromine the following procedure may also be used:

Synthesis of an N-substituted 4-phenyl-4-carbalkoxy-piperidine of the formula

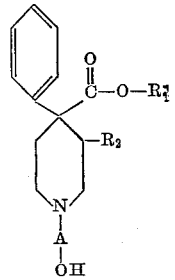

(VI)

wherein $R_1$ and $R_2$ have the meanings previously defined, by reacting a 4-phenyl-4-carbalkoxy-piperidine of the Formula II above with a compound of the formula $$Hal\text{—}A\text{—}OH \quad (VII)$$

wherein A has the meanings previously defined and Hal is chlorine, bromine or iodine, under the reaction conditions set forth under method A, or by reacting a 1,5-dihalo-3-phenyl-3-carbalkoxy-pentane of the Formula IV above with a primary amine of the formula $$H_2N—A—OH \qquad (VIII)$$

wherein A has the meanings previously defined, under the reaction conditions set forth under method B, and thereafter exchanging the OH-group in Compound VI for chlorine or bromine with the aid of a halogenating agent. The exchange of the hydroxyl group for chlorine or bromine is advantageously effected by reacting Compound VI with thionyl chloride or thionyl bromide in the presence of an inert organic solvent, such as chloroform.

The non-toxic acid addition salts of the basic compounds embraced by Formula I above may be obtained by reacting the free bases with an inorganic or organic acid comprising a physiologically compatible anion, for example in ethereal or alcoholic solution, that is, by methods customarily employed for the preparation of acid addition salts of organic compounds comprising a basic nitrogen atom. Typical examples of such acids are hydrochloric acid, perchloric acid, hydrobromic acid, sulfuric acid, nitric acid, methane sulfonic acid, tartaric acid, succinic acid, salicylic acid and the like.

The following examples shall further illustrate our invention and enable others skilled in the art to understand the invention more completely. It should be understood, however, that our invention is not limited to these particular examples.

EXAMPLE I

*Preparation of 1-(6'-Nitro-n-Hexyl-1')-4-Phenyl-4-Carbethoxy-Piperidine Hydrochloride by Method A*

A mixture of 23.3 gm. (0.10 mol) of 4-phenyl-piperidine-4-carboxylic acid ethyl ester, 21.0 gm. (0.10 mol) of 1-bromo-6-nitro-hexane, 9.2 gm. (0.11 mol) of sodium bicarbonate and 100 cc. of ethanol was refluxed for three hours, accompanied by stirring. Thereafter, the reaction mixture was allowed to cool and the precipitated inorganic salts were filtered off. The ethanol solvent was removed from the filtrate by evaporation in vacuo. The oily evaporation residue, consisting of raw 1-(6'-nitro-n-hexyl-1')-4-phenyl-4-carbethoxy-piperidine, was stirred with 50 cc. of water and 5 cc. of concentrated hydrobromic acid. The mixture was cooled and the walls of the container were scratched, whereby crystallization was initiated. Thereafter, the mixture was allowed to stand for twenty-four hours at 5° C., and at the end of that time the crystals which had formed were separated by vacuum filtration, washed with water and dried. 39.5 gm. (89% of theory) of 1-(6'-nitro-n-hexyl-1')-4-phenyl-4 - carbethoxy - piperidine hydrobromide of the formula

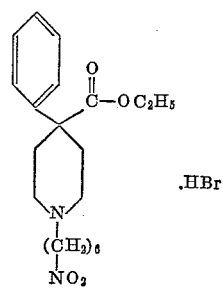

were obtained. After recrystallization from water the product had a melting point of 131° C.

Using a procedure analogous to that described above, the following additional N-substituted 4-phenyl-4-carbethoxy-piperidines were prepared:

(a) 1-(4'-nitro-n-butyl-1')-4-phenyl - 4 - carbethoxy-piperidine hydrobromide, M.P. 162° C., of the formula

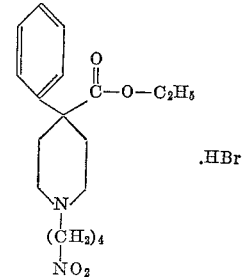

from 0.1 mol of 4-phenyl-piperidine-4-carboxylic acid ethyl ester and 18.2 gm. (0.1 mol) of 1-bromo-4-nitro-butane. The reaction mixture was refluxed for three hours. Yield: 33 gm. (80% of theory).

(b) 1-(5'-nitro-n-pentyl-1')-4-phenyl - 4 - carbethoxy-piperidine hydrobromide, M.P. 133° C., of the formula

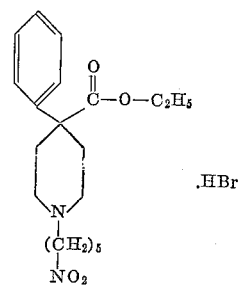

from 0.1 mol of 4-phenyl-piperidine-4-carboxylic acid ethyl ester and 19.6 gm. (0.1 mol) of 1-bromo-5-nitro-pentane. The reaction mixture was refluxed for thirty-six hours. Yield: 30 gm. (70% of theory).

(c) 1-(7'-nitro-n-heptyl-1')-4-phenyl - 4 - carbethoxy-piperidine hydrobromide, M.P. 92° C., of the formula

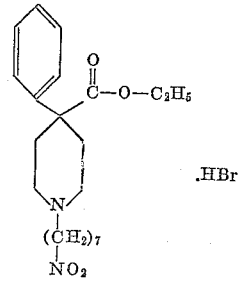

from 0.1 mol of 4-phenyl-piperidine-4-carboxylic acid ethyl ester and 22.4 gm. (0.1 mol) of 1-bromo-7-nitro-heptane. The reaction mixture was refluxed for four hours. Yield: 29 gm. (63% of theory).

(d) 1-(8'-nitro-n-octyl-1')-4-phenyl-4 - carbethoxy - piperidine perchlorate, M.P. 120° C., of the formula

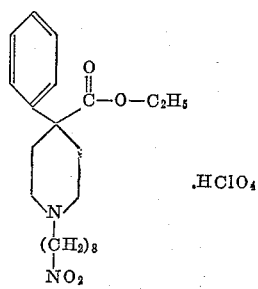

from 0.1 mol of 4-phenyl-piperidine-4-carboxylic acid ethyl ester and 23.6 gm. (0.1 mol) of 1-bromo-8-nitro-octane. The reaction mixture was refluxed for twenty-four hours, the hydrobromide initially obtained was converted into the free base with NaOH, and the free base was converted into the perchlorate by adding perchloric acid. Yield: 32 gm. (65% of theory).

(e) 1-(5'-fluoro-n-pentyl-1')-4-phenyl - 4 - carbethoxy-piperidine hydrobromide, M.P. 182° C., of the formula

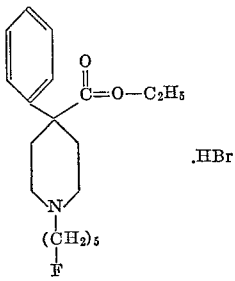

from 0.1 mol of 4-phenyl-piperidine-4-carboxylic acid ethyl ester and 16.9 gm. (0.1 mol) of 1-bromo-5-fluoro-pentane. The reaction mixture was refluxed for three hours. Yield: 36 gm. (90% of theory).

(f) 1-(6'-fluoro-n-hexyl-1') - 4 - phenyl - 4 - carbethoxy-piperidine hydrobromide, M.P. 160° C., of the formula

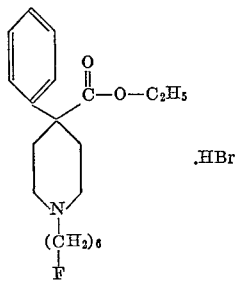

from 0.1 mol of 4-phenyl-piperidine-4-carboxylic acid ethyl ester and 18.3 gm. (0.1 mol) of 1-bromo-6-fluoro-hexane. The reaction mixture was refluxed for fourteen hours. Yield: 33 gm. (80% of theory).

(g) 1-6'-nitro-n-hexyl-1')-4-phenyl - 4 - carbopropoxy-piperidine hydrobromide, M.P. 124° C., of the formula

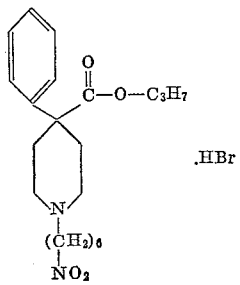

from 24.7 gm. (0.1 mol) of 4-phenyl-piperidine-4-carboxylic acid propyl ester and 21.0 gm. (0.1 mol) of 1-bromo-6-nitro-hexane. The reaction mixture was refluxed for six hours. Yield: 42 gm. (92% of theory).

(h) 1-(6'-nitro-n-hexyl-1')-4-phenyl-4 - carbomethoxy-piperidine hydrobromide, M.P. 186° C., of the formula

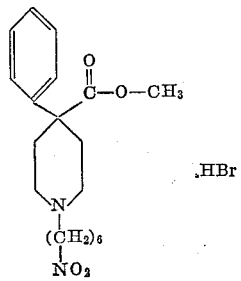

from 21.9 gm. (0.1 mol) of 4-phenyl-piperidine-4-carboxylic acid methyl ester and 21.0 gm. (0.1 mol) of 1-bromo-6-nitro-hexane. The reaction mixture was refluxed for three hours. Yield: 37 gm. (86% of theory).

(i) 1-(7'-fluoro-n-heptyl-1')-4-phenyl - 4 - carbethoxy-piperidine hydrobromide, M.P. 152° C., of the formula

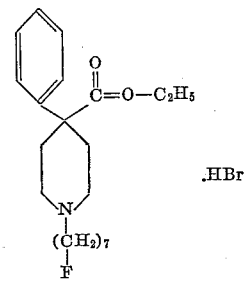

from 0.1 mol of 4-phenyl-piperidine-4-carboxylic acid ethyl ester and 19.7 gm. (0.1 mol) of 1-bromo-7-fluoro-heptane.

(j) 1-(5'-nitro-3'-methyl-n-pentyl - 1') - 4 - phenyl - 4 - carbethoxy-piperidine hydroiodide, M.P. 167° C., of the formula

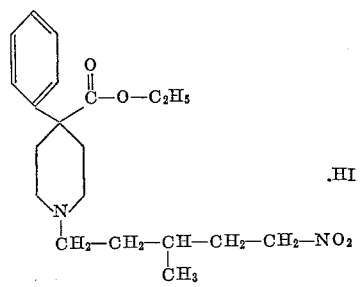

from 0.1 mol of 4-phenyl-piperidine-4-carboxylic acid ethyl ester and 21.0 gm. (0.1 mol) of 1-bromo-3-methyl-5-nitro-pentane, and conversion of the free base into its hydroiodide with aqueous hydrogen iodide.

(k) 1-(6'-fluoro-n-hexyl-1')-3α-methyl - 4 - phenyl - 4 - carbethoxy-piperidine hydrobromide, M.P. 173° C., of the formula

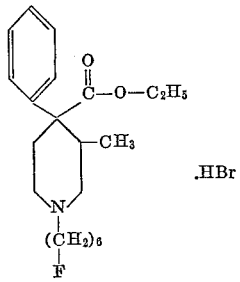

from 25.0 gm. (0.1 mol) of 3α-methyl-4-phenyl-4-carbethoxy-piperidine and 18.3 gm. (0.1 mol) of 1-bromo-6-fluoro-hexane. Yield: 58% of theory.

(l) 1-(7'-fluoro-n-heptyl-1')-3α-methyl-4-phenyl-4-carbethoxy-piperidine hydrobromide, M.P. 152° C., of the formula

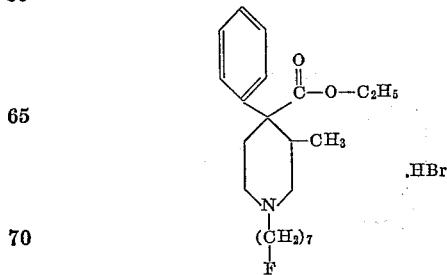

from 25.0 gm. (0.1 mol) of 3α-methyl-4-phenyl-4-carbethoxy-piperidine and 19.7 gm. (0.1 mol) of 1-bromo-7-fluoro-heptane. Yield: 50% of theory.

(m) 1 - (6'-nitro-n-hexyl-1')-3α-methyl-4-phenyl-4-carbethoxy-piperidine hydrobromide of the formula

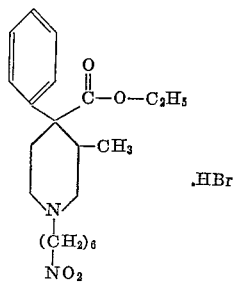

from 25.0 gm. (0.1 mol) of 3α-methyl-4-phenyl-4-carbethoxy-piperidine and 21.0 gm. (0.1 mol) of 1-bromo-6-nitro-hexane. The product was obtained in the form of an oil.

(n) 1-(5'-fluoro-n-pentyl-1')-3β-methyl-4-phenyl-4-carbethoxy-piperidine hydrobromide, M.P. 184° C., of the formula

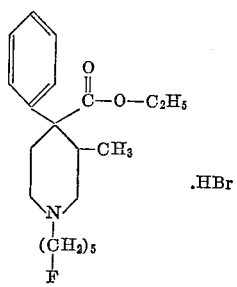

from 25.0 gm. (0.1 mol) of 3β-methyl-4-phenyl-4-carbethoxy-piperidine and 16.9 gm. (0.1 mol) of 1-bromo-5-fluoro-pentane. Yield: 70% of theory.

(o) 1-(6'-fluoro-n-hexyl-1')-3β-methyl-4-phenyl-4-carbethoxy-piperidine hydrobromide, M.P. 157° C., of the formula

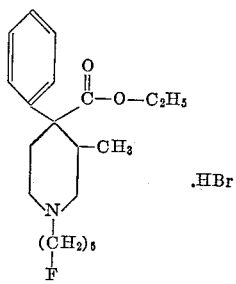

from 25.0 gm. (0.1 mol) of 3β-methyl-4-phenyl-4-carbethoxy-piperidine and 18.3 gm. (0.1 mol) of 1-bromo-6-fluoro-hexane. Yield: 65% of theory.

(p) 1-(7'-fluoro-n-heptyl-1')-3β-methyl-4-phenyl-4-carbethoxy-piperidine perchlorate, M.P. 116° C., of the formula

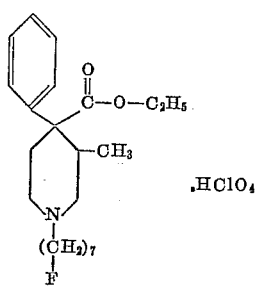

from 25.0 gm. (0.1 mol) of 3β-methyl-4-phenyl-4-carbethoxy-piperidine and 19.7 gm. (0.1 mol) of 1-bromo-7-fluoro-heptane. Yield: 65% of theory.

(q) 1 - (6'-nitro-n-hexyl-1')-3β-methyl-4-phenyl-4-carbethoxy-piperidine hydrochloride, M.P. 135° C., of the formula

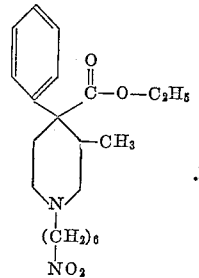

from 25.0 gm. (0.1 mol) of 3β-methyl-4-phenyl-4-carbethoxy-piperidine and 21.0 gm. (0.1 mol) of 1-bromo-6-nitro-hexane. Yield: 80% of theory.

(r) 1 - (5' - nitro-3'-methyl-n-pentyl-1') - 3β-methyl-4-phenyl-4-carbethoxy-piperidine perchlorate, M.P. 165° C., of the formula

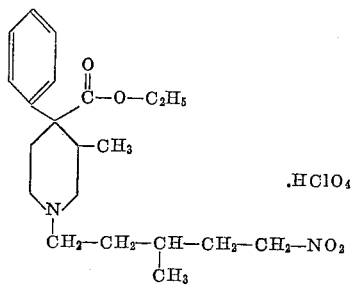

from 25.0 gm. (0.1 mol) of 3β-methyl-4-phenyl-4-carbethoxy-piperidine and 21.0 gm. (0.1 mol) of 1-bromo-3-methyl-5-nitro-pentane. Yield: 45% of theory.

EXAMPLE II

*Preparation of 1-(6'-Chloro-n-Hexyl-1')-4-Phenyl-4-Carbethoxy-Piperidine Hydrochloride by Method D*

A solution of 3.37 gm. (0.01 mol) of 1-(6'-hydroxy-n-hexyl-1')-4-phenyl-4-carbethoxy-piperidine (M.P. of free base=83° C.) in 30 cc. of chloroform was slowly added, while stirring, to a solution of 5 cc. of thionyl chloride in 30 cc. of chloroform which had been cooled to —10° C. Thereafter, the resulting mixture was stirred first for one hour at —10° C., then for two hours at room temperature and finally for one hour at 40° C. Subsequently, the chloroform and the excess thionyl chloride were distilled off in vacuo on a water bath at a bath temperature of 30–40° C. The distillation residue was recrystallized from a mixture of acetone and ether, yielding 3.5 gm. (90% of theory) of 1-(6'-chloro-n-hexyl-1')-4-phenyl-4-carbethoxy-piperidine hydrochloride, M.P. 114° C., of the formula

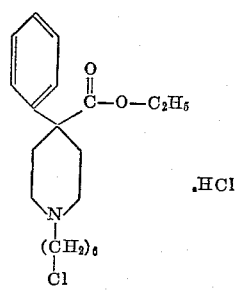

Using a procedure analogous to that described above, the following additional N-substituted 4-phenyl-4-carbalkoxy-piperidines were prepared:

(a) 1-(5'-chloro-n-pentyl-1')-4-phenyl-4-carbethoxy-piperidine hydrochloride, M.P. 161° C., of the formula

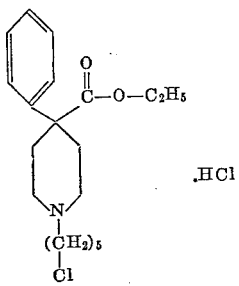

from 3.19 gm. (0.01 mol) of 1-(5'-hydroxy-n-pentyl-1')-4-phenyl-4-carbethoxy-piperidine and thionyl chloride. Yield: 3.2 gm. (85% of theory).

(b) 1-(6'-chloro-n-hexyl-1')-3β-methyl-4-phenyl-4-carbethoxy-piperidine hydrochloride, M.P. 117° C., of the formula

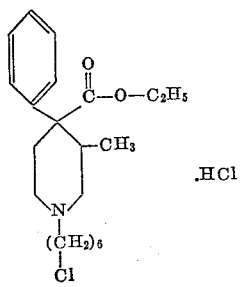

from 3.51 gm. (0.01 mol) of 1-(6'-hydroxy-n-hexyl-1')-3β-methyl-4-phenyl-4-carbethoxy-piperidine (M.P. of hydrochloride=105° C.) and thionyl chloride. Yield: 80% of theory.

The compounds according to the present invention, that is, those embraced by Formula I above and their non-toxic, pharmacologically acceptable acid addition salts, have useful pharmacodynamic properties. More particularly, they exhibit strong central analgesic activities which substantially exceed the central analgesic activity of morphine. In addition, the compounds of the present invention are substantially less toxic than morphine and exhibit none of the undesirable side effects of morphine, such as respiratory depression and tonicizing effect upon the sphincter vesical.

The compounds of the present invention also exhibit antitussive properties.

The central analgesic activity of the compounds according to the present invention was tested and demonstrated on a statistically significant number of adult white mice by the standard pharmacological method of F. Haffner, Deutsche Medizinische Wochenschrift, vol. 54, pages 731–733 (1929). The compounds to be investigated were administered by subcutaneous injection. The following table shows the results of these pharmacological tests for seven representative compounds of the group embraced by Formula I above. The $ED_{50}$ values, which were graphically determined for each compound in question, represent the dosages which produced detectable analgesia in 50% of the animals. For purposes of comparison, the corresponding values of morphine and meperidine (1-methyl-4-phenyl-4-carbethoxy-piperidine) are given. The analgesic activity of morphine was assigned an arbitrary value of 1, and the right-hand column of the table shows the relative central analgesic activity of each compound in question, based on the activity of morphine. In other words, the particular relative values were calculated by dividing the $ED_{50}$ of morphine (16.0 mgm./kg.) by the graphically determined $ED_{50}$ of the particular compound of the invention.

| Compound | $ED_{50}$, mgm./kg. | Relative Central Analgesic Activity Basis: Morphine=1 |
|---|---|---|
| 1-(6'-fluoro-n-hexyl-1')-3β-methyl-4-phenyl-4-carbethoxy-piperidine hydrobromide | 0.35 | 45–50 |
| 1-(7'-fluoro-n-heptyl-1')-3β-methyl-4-phenyl-4-carbethoxy-piperidine perchlorate | 0.075 | 200 |
| 1-(6'-nitro-n-hexyl-1')-3β-methyl-4-phenyl-4-carbethoxy-piperidine hydrochloride | 0.35 | 45–50 |
| 1-(6'-chloro-n-hexyl-1')-3β-methyl-4-phenyl-4-carbethoxy-piperidine hydrochloride | 0.58 | 25 |
| 1-(7'-nitro-n-heptyl-1')-4-phenyl-4-carbethoxy-piperidine hydrobromide | 1.6 | 10 |
| 1-(6'-nitro-n-hexyl-1')-4-phenyl-4-carbethoxy-piperidine hydrobromide | 2.3 | 7 |
| 1-(6'-fluoro-n-hexyl-1')-4-phenyl-4-carbethoxy-piperidine hydrobromide | 2.4 | 6–7 |
| Morphine | 16.0 | 1 |
| Meperidine | | 0.14 |

The values tabulated above clearly show that the compounds according to the present invention are anywhere from 7 to 200 times more active as central analgesics than morphine and from about 50 to about 1400 times more active as central analgesics than meperidine, the structurally most closely related known compound.

For pharmaceutical purposes the compounds of the present invention are administered in dosages of 5 to 15 mgm., preferably 8 to 12 mgm., in the form of customary dosage unit compositions consisting of the desired amount of the particular piperidine compound uniformly distributed in a physiologically compatible solid or liquid carrier. The following examples illustrate a few typical dosage unit compositions comprising a representative compound according to the present invention as the active central analgesic ingredient. The parts are parts by weight unless otherwise specified.

EXAMPLE III

*Ampules With Hypodermic Solution*

The hypodermic solution is compounded from the following ingredients:

Parts
1-(6'-fluoro-n-hexyl-1')-3β-methyl-4-phenyl-4-carbethoxy-piperidine hydrobromide _____ 8
Sodium chloride _____ 7.5
Distilled water, q.s. ad. 1.0 part by vol.

*Compounding procedure.*—The piperidine compound and the sodium chloride are dissolved in the distilled water, and the resulting solution is filled into 1 cc.-ampules, which are then sterilized. Each ampule contains 8 mgm. of the active ingredient.

EXAMPLE IV

*Suppositories*

The suppositories are compounded from the following ingredients:

Parts
1-(6'-fluoro-n-hexyl-1')-3β-methyl-4-phenyl-4-carbethoxy-piperidine hydrobromide _____ 10.0
Lactose _____ 292.0
Cocoa butter _____ 1,500.0

Total _____ 1,802.0

*Compounding procedure.*—The piperidine compound is intimately admixed with the lactose and the mixture is uniformly suspended in the molten cocoa butter. The suspension is poured into cooled suppository molds, each holding about 1800 mgm. of the suspension. Each suppository contains 10 mgm. of the active ingredient.

EXAMPLE V

Drops for Oral Administration

The drop solution is compounded from the following ingredients:

| | Parts |
|---|---|
| 1-(6'-fluoro-n-hexyl-1')-3β-methyl-4-phenyl-4-carbethoxy-piperidine hydrobromide | 100 |
| p-Hydroxy-benzoic acid methyl ester | 7 |
| p-Hydroxy-benzoic acid propyl ester | 3 |
| Distilled water, q.s. ad. 1000 parts by vol. | |

*Compounding procedure.*—The p-hydroxy-benzoic acid methyl ester and the p-hydroxy-benzoic acid propyl ester are dissolved in the hot distilled water, and after the resulting solution has cooled the piperidine compound is added. 1 cc. of the finished solution contains 10 mgm. of the active analgesic ingredient.

EXAMPLE VI

Tablets

The tablets are compounded from the following ingredients:

| | Parts |
|---|---|
| 1-(6'-fluoro-n-hexyl-1')-3β-methyl-4-phenyl-4-carbethoxy-piperidine hydrobromide | 10.0 |
| Lactose | 110.0 |
| Soluble starch | 5.0 |
| Corn starch | 73.0 |
| Magnesium stearate | 2.0 |
| Total | 200.0 |

*Compounding procedure.*—The piperidine compound, the lactose and the corn starch are thoroughly admixed with each other, the mixture is granulated with the aid of an aqueous solution of the soluble starch and the granulate is dried. The dry granulate is thoroughly blended with the magnesium stearate and the resulting mixture is pressed into 200 mgm. tablets. Each tablet contains 10 mgm. of the analgesic ingredient.

Obviously, any of the other piperidine compounds according to the present invention may be substituted for the illustrative compound in the various dosage unit compositions described above. Moreover, the active ingredient content of the dosage unit compositions may be varied within the limits specified above to meet specific requirements.

While we have illustrated our invention with the aid of certain specific embodiments, it will be readily apparent to others skilled in the art that the present invention is not limited to these specific embodiments aid that various changes and modifications may be made without departing from the spirit of the invention or the scope of the appended claims.

We claim:

1. A central analgesic composition consisting essentially of a physiologically compatible carrier having uniformly distributed therein from 5 to 15 mgm. of a compound selected from the group consisting of N-substituted 4-phenyl-4-carbalkoxy-piperidines of the formula

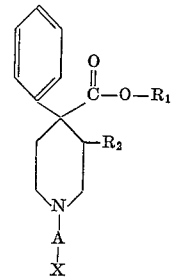

wherein $R_1$ is lower alkyl of 1 to 4 carbon atoms, $R_2$ is selected from the group consisting of hydrogen and lower alkyl, A is a bivalent saturated acylic hydrocarbon of 4 to 8 carbon atoms, and X is selected from the group consisting of halogen and nitro, and their non-toxic, pharmacologically acceptable acid addition salts.

2. The method of producing central analgesia in warm-blooded animals which comprises administering from 5 to 15 mgm. of a compound selected from the group consisting of N-substituted 4-phenyl-4-carbalkoxy-piperidines of the formula

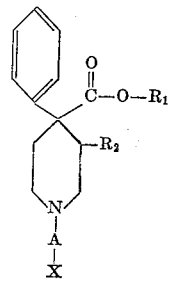

wherein $R_1$ is lower alkyl of 1 to 4 carbon atoms, $R_2$ is selected from the group consisting of hydrogen and lower alkyl, A is a bivalent saturated acyclic hydrocarbon of 4 to 8 carbon atoms, and X is selected from the group consisting of halogen and nitro, and their non-toxic, pharmacologically acceptable acid addition salts.

References Cited in the file of this patent

UNITED STATES PATENTS

| 2,741,619 | Lucas | Apr. 10, 1956 |
| 2,746,964 | Biel | May 22, 1956 |
| 2,846,437 | Elpern | Aug. 5, 1958 |
| 3,036,954 | Robbins | May 29, 1962 |
| 3,036,955 | Kuna | May 29, 1962 |